US007506213B1

(12) United States Patent
Cabrera, III et al.

(10) Patent No.: US 7,506,213 B1
(45) Date of Patent: Mar. 17, 2009

(54) METHOD AND APPARATUS FOR HANDLING DATA CORRUPTION OR INCONSISTENCY IN A STORAGE SYSTEM

(75) Inventors: George Cabrera, III, San Francisco, CA (US); Raymond C. Chen, Campbell, CA (US); Paul C. Eastham, Mountain View, CA (US); Sreelatha Reddy, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 457 days.

(21) Appl. No.: 11/336,168

(22) Filed: Jan. 19, 2006

(51) Int. Cl.
*G06F 11/00* (2006.01)
(52) U.S. Cl. .................... 714/42; 714/4; 714/7; 714/26
(58) Field of Classification Search .................. 714/4, 714/7, 8, 26, 42
See application file for complete search history.

(56) References Cited

U.S. PATENT DOCUMENTS

| | | | |
|---|---|---|---|
| 6,408,406 B1 * | 6/2002 | Parris | 714/41 |
| 6,631,493 B2 * | 10/2003 | Ottesen et al. | 714/774 |
| 6,895,413 B2 | 5/2005 | Edwards | |
| 7,103,610 B2 * | 9/2006 | Johnson et al. | 707/102 |
| 7,308,603 B2 * | 12/2007 | Carver et al. | 714/8 |
| 2002/0184580 A1 * | 12/2002 | Archibald et al. | 714/719 |
| 2003/0140271 A1 * | 7/2003 | Wynn et al. | 714/8 |
| 2006/0195728 A1 * | 8/2006 | Lin et al. | 714/42 |

OTHER PUBLICATIONS

SGI—Developer Central Open Source—Linux XFS, "XFS: A high-performance journaling filesystem", Jan. 10, 2006, http://oss.sgi.com/projects/xfs/, 4 pages.
SGI—Developer Central Open Source—Linux XFS, "Linux XFS FAQ", Jan. 10, 2006, http://oss.sgi.com/projects/xfs/faq.html, 4 pages.
SGI—Developer Central Open Source—Linux XFS, "XFS Talks, Papers, Articles, . . . ", Jan. 10, 2006, http://oss.sgi.com/projects/xfs/publications.html, 1 page.

* cited by examiner

*Primary Examiner*—Robert Beausoliel
*Assistant Examiner*—Charles Ehne
(74) *Attorney, Agent, or Firm*—Blakely, Sokoloff, Taylor & Zafman LLP

(57) ABSTRACT

A method for handling a fault in a storage system comprises maintaining data in a mass storage subsystem and providing access to the data on behalf of a client. The method further comprises detecting a fault in a volume of data stored in the mass storage subsystem, determining a severity of the fault, and selecting a course of action in response to the fault, based on the severity of the fault.

24 Claims, 6 Drawing Sheets

METHOD AND APPARATUS FOR HANDLING DATA CORRUPTION OR INCONSISTENCY IN A STORAGE SYSTEM

FIELD OF THE INVENTION

At least one embodiment of the present invention pertains to data storage systems, and more particularly, to a method and apparatus for handling data corruption or inconsistency in a storage system.

BACKGROUND

Various forms of network-based storage systems exist today, including network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server is commonly a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with access to stored data at a sub-file level of granularity, such as block-level access, rather than file-level access. Some storage servers are capable of providing clients with both file-level access and block-level access, such as certain Filers made by Network Appliance, Inc. (NetApp®) of Sunnyvale, Calif.

In essentially any computing system or data storage system, data can become corrupted or inconsistent with its associated metadata. This is true even for sophisticated, enterprise-level storage servers, which typically employ fairly robust error detection and correction techniques, such as forms of RAID. Although certain levels of RAID provide error detection and correction, data can occasionally become corrupted or inconsistent in a way that may be too severe for RAID software to correct. An example of this is certain types of double disk failure, such as where a second disk fails during an attempt to recover a first failed disk.

A problem in designing storage servers is how to handle this type of data error or inconsistency. Many if not all storage servers will simply "panic" when they try to read corrupted or inconsistent data from disk. A panic is when the storage server is unable to continue operating normally, and has to shut down or reboot. A panic frequently also involves a "core dump" prior to shutdown or reboot. The term core dump refers to the creation of a file which represents the complete, unstructured state of the working memory of the storage server at the time of a panic. The file, which is typically called a "core file", can be transmitted to a remote computer associated with a customer support group at the manufacturer of the storage server, just prior to shut down during a panic, or immediately upon reboot afterwards.

In many applications, a panic can be much less desirable than occasionally encountering corrupted or inconsistent data. For example, a panic may require client/user sessions to be reset, which may result in users losing important data. The down time associated with a panic can also be extremely costly and undesirable, especially in large-scale (e.g., enterprise-level) storage systems. Furthermore, panicking is usually not a desirable way to handle data corruption or inconsistency, since the system will likely just panic again the next time it attempts to access the faulty data.

SUMMARY OF THE INVENTION

The present invention includes a method and apparatus for handling faulty (e.g., corrupted or inconsistent) data in a storage system. In at least one embodiment, the method comprises maintaining data in a mass storage subsystem and providing access to the data on behalf of a client. The method further comprises detecting a fault in a volume of data stored in the mass storage subsystem, determining a severity of the fault, and selecting a course of action in response to the fault, based on the severity of the fault.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
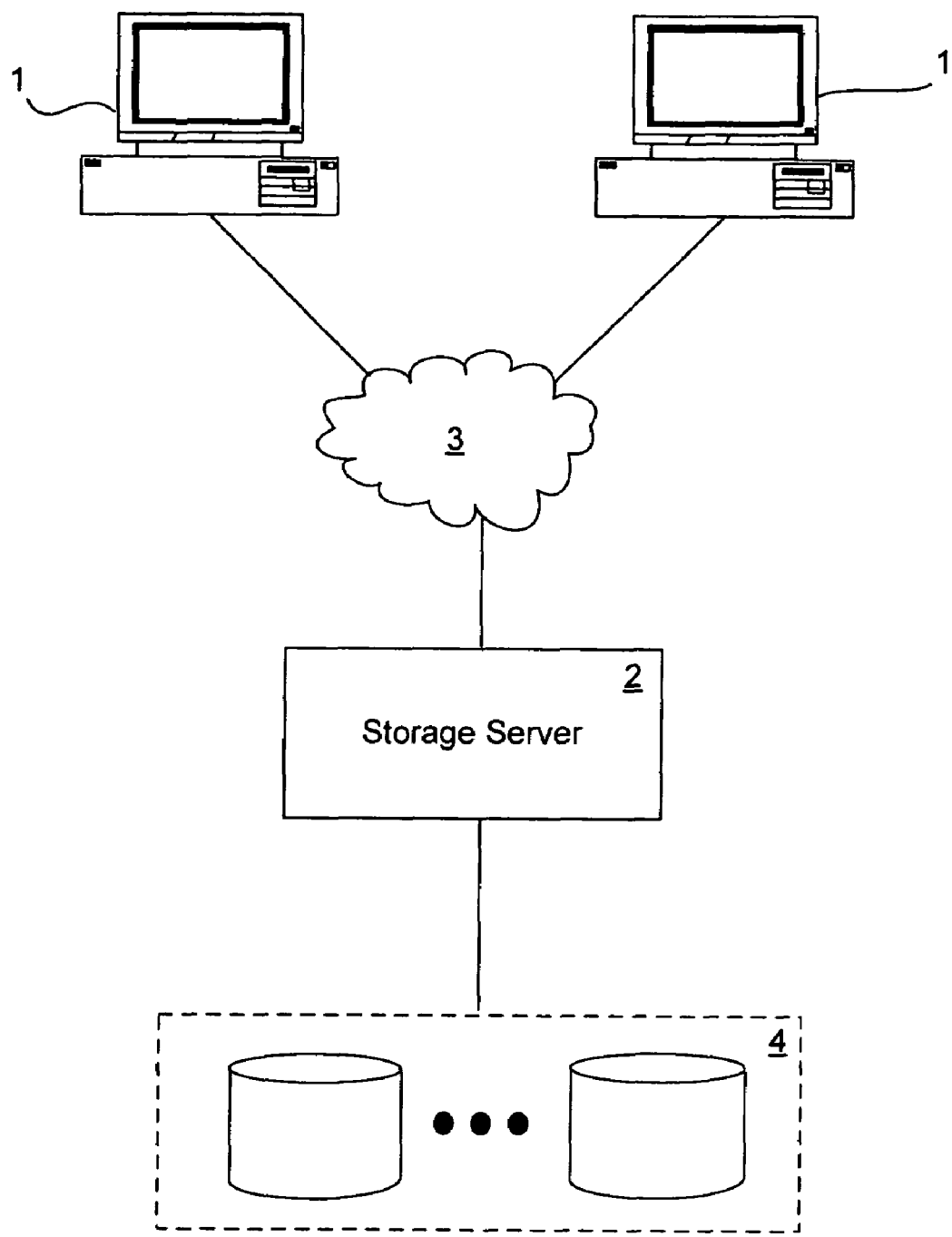
FIG. 1 illustrates a storage network environment which includes a storage server.

A method and apparatus for handling data corruption or inconsistency in a network storage system are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

As noted above, there are various reasons why it may be undesirable for a storage server to panic in response to attempting to access faulty (e.g., corrupted or inconsistent) data. In many situations, it is better to have a particular file, or portion of a file, be inaccessible, then to have a storage server panic and potentially become stuck in a panic loop. Accordingly, in embodiments of the invention, a storage server responds to a data fault by selecting a particular course of action based on the severity of the fault, without necessarily panicking.

As described further below, the method introduced here for handling data corruption or inconsistency can be implemented in a storage server which maintains and accesses data in a mass storage subsystem on behalf of one or more clients. In an embodiment of the invention, the storage server detects data corruption or inconsistency in a volume of data stored in the mass storage subsystem. Instead of immediately panicking in response to detecting the corruption or inconsistency, the storage server first determines the severity of the data corruption or inconsistency. If the data corruption or inconsistency does not exceed a predetermined criterion for measuring the severity, then the storage server may simply deny access by clients to only the portion of the volume which contains the corruption or inconsistency, but continue to allow client access to the remainder of the volume. For certain types of errors, such as minor errors and/or errors which are easily correctable, the storage server may instead attempt to automatically correct the error (if necessary) and/or continue with normal operation.

In one embodiment of the invention, to keep track of faulty data blocks, the storage server maintains for each volume a data structure, which has a user-configured size. The data structure contains entries representing faulty file blocks in a metadata file. If the data structure for any given volume satisfies a predetermined criterion, the volume is taken offline (i.e., made inaccessible to clients). If corrupted or inconsistent data is detected without the predetermined criterion being satisfied, then appropriate error messages are generated, and access is denied to the faulty data; however, the volume remains online and the portions of the volume which are not faulty remain accessible to clients.

Note that many techniques are known today for detecting corrupted or inconsistent data. It is assumed for purposes of this description that the storage server described herein has such capability. The technique introduced here focuses on handling the data corruption or inconsistency after it has been discovered by any available method, rather than on detecting such problems. Therefore, a description of techniques for detecting corrupted or inconsistent data is unnecessary for an understanding of the technique introduced here.

FIG. 1 shows a simple example of a network environment which incorporates a storage server 2, in which the technique introduced here can be implemented. The storage server 2 is coupled to a storage subsystem 4 which includes a set of mass storage devices, and to a set of storage clients 1 (hereinafter simply "clients") through a network 3. The network 3 may be, for example, a local area network (LAN), a wide area network (WAN), a global area network (GAN) such as the Internet, or a combination of such networks. Each of the clients 1 may be, for example, a conventional personal computer (PC), workstation, or the like.

The storage subsystem 4 is managed by the storage server 2. The storage server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, magnetic tape storage, or any other type of non-volatile storage devices suitable for storing large quantities of data.

Although illustrated as a self-contained element, the storage server 2 may have a distributed architecture; for example, it may include a separate N- ("network") blade and D- (disk) blade (not shown). In such an embodiment, the N-blade is used to communicate with clients 1, while the D-blade includes the file system functionality and is used to communicate with the storage subsystem 4. The N-blade and D-blade communicate with each other using an internal protocol. Alternatively, the storage server 2 may have an integrated architecture, where the network and data components are all contained in a single box. The storage server 2 further may be coupled through a switching fabric to other similar storage servers (not shown) which have their own local storage subsystems. In this way, all of the storage subsystems can form a single storage pool, to which any client of any of the storage servers has access.

Figure 2:
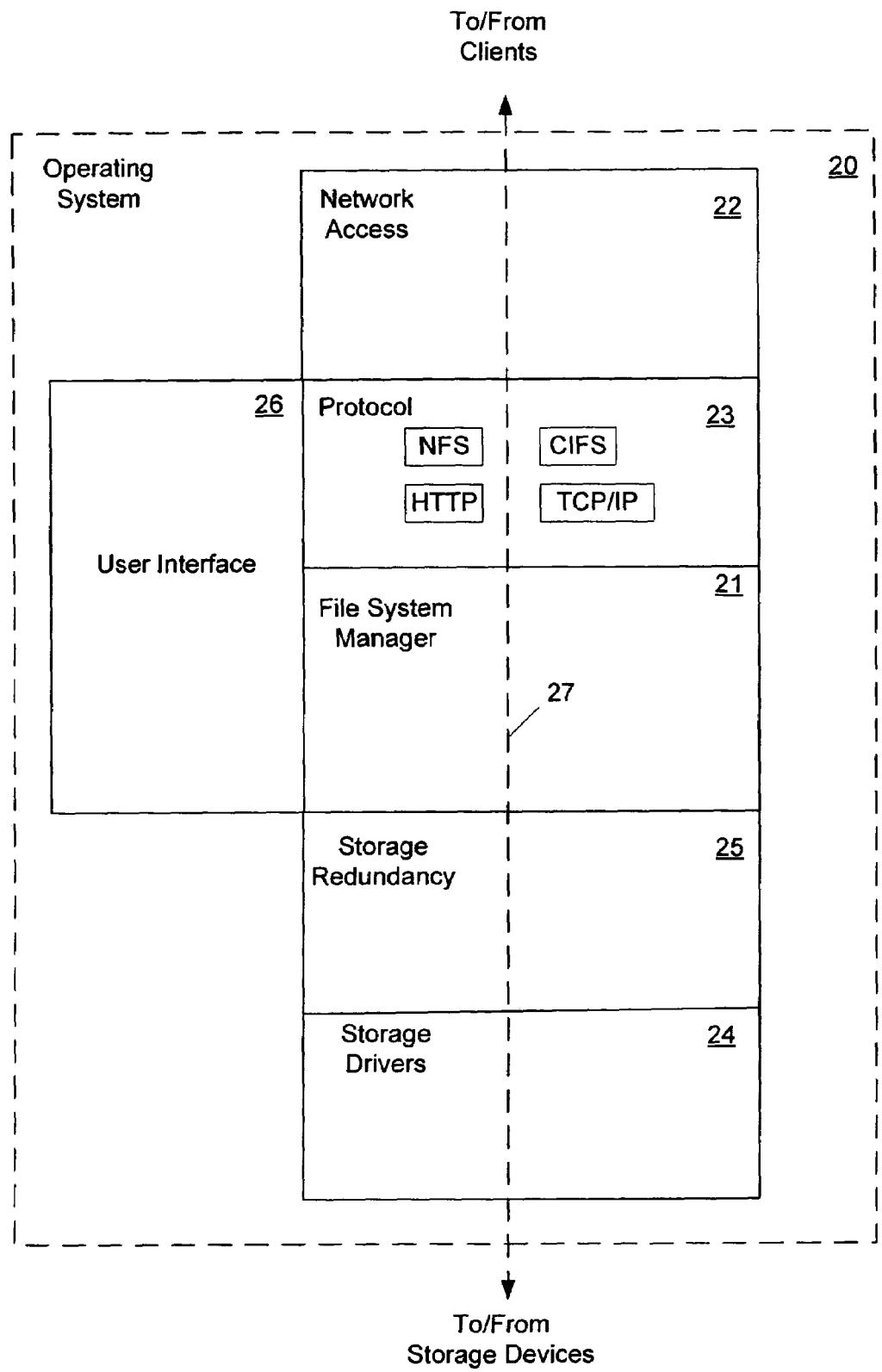
FIG. 2 illustrates the architecture of the operating system of the storage server.

The storage server 2 includes an operating system to control its operation, an example of which is shown in FIG. 2. The operating system 20 is preferably implemented as software. However, in some embodiments, some or all of the elements of the operating system 20 may instead be implemented in the form of hardware (e.g., specially designed circuitry), or as a combination of hardware and software.

As shown, the operating system 20 includes several modules, or "layers". These layers include a file system manager 21. The file system manager 21 is software (in one embodiment) that manages the one or more file systems managed by the storage server 2. A "file system", as the term is used here, is a structured (e.g. hierarchical), independently managed, self-contained set of stored data, such as files, directories and/or other types of data containers. The file system manager 21 imposes a hierarchy (e.g., a directory/file structure) on the data stored in the storage subsystem 4 and manages client-initiated read and write operations at a high level (while delegating certain functions to lower layers of the operation system 20).

To allow the storage server 2 to communicate over the network 3 (e.g., with clients 1), the operating system 20 also includes a network access layer 22, and a protocol layer 23 operatively coupled between the file system manager 21 and the network access layer 22. The network access layer 22 includes one or more drivers which implement one or more lower-level protocols to communicate over the network, such as Ethernet or Fibre Channel.

The protocol layer 22 implements a number of higher-level network protocols, such as Network File System (NFS), Common Internet File System (CIFS), Hypertext Transfer Protocol (HTTP) and Transmission Control Protocol/Internet Protocol (TCP/IP). The protocol layer 22 includes separate modules to implement each of these protocols, as shown. Each module is responsible for translating commands and other messages received over the network 3 into a format that is understandable by the file system manager 21, and for translating responses and other messages generated by the file system manager 21 into the appropriate protocol being used by a particular client, for transmission over the network 3.

To enable the storage server 2 to communicate with the storage subsystem 4, the operating system 20 also includes a storage driver layer 24, and a storage redundancy layer 25 operatively coupled between the file system manager 21 and the storage driver layer 24. The storage access layer 25 implements a higher-level disk storage protocol, such as RAID-4, RAID-5 or RAID-DP, while the storage driver layer 24 implements a lower-level storage device access protocol, such as Fibre Channel Protocol (FCP) or SCSI. The storage access layer 25 is alternatively called the "RAID layer" in this description.

The operating system 20 also includes a user interface 26 to generate a command line interface (CLI) and/or graphical user interface (GUI), to allow administrative control and configuration of the storage server 2, from a local or remote terminal. Also shown in FIG. 2 is the path 27 of data flow, through the operating system 20, associated with a client-initiated read or write request.

Before further discussing the technique introduced here, it is useful to define certain terminology. Some storage servers organize stored data into logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit, such as a complete file system. A "file system", as noted above, is an independently managed, self-contained, hierarchal set of data units (e.g., files, blocks or LUNs). Although a volume or file system (as those terms are used herein) may store data in the form of files, that is not necessarily the case. That is, a volume or file system may store data in the form of other units of data, such as blocks or LUNs.

The storage server 2 of FIG. 1 maintains various hierarchical data structures, called buffer trees, to keep track of the organization of data blocks stored in an "aggregate" (defined below). A buffer tree may represent, for example, a file defined within a volume. Buffer trees are used by the file system manager 21 to locate data blocks within files or other logical data containers.

Each buffer tree typically references numerous data blocks. Some of these data blocks contain actual data—these are referred to alternatively as "direct" blocks, "level 0" blocks, or "L0" blocks. Some data blocks in a buffer tree contain pointers to other blocks but no user-level data—these are referred to as "indirect blocks". There can be multiple levels of indirect blocks in a buffer tree (e.g., "level 1" ("L1") blocks, "level 2" ("L2") blocks, etc.; however, there is always only one level of direct (L0) blocks, which is the lowest level of the buffer tree. Every inode and indirect block in a buffer tree includes at least one pointer for every data block it references.

The root of a buffer tree for a user data file is the inode of the file. An "node" in this context is a metadata container which is used to store metadata about the file, such as the ownership of the file, access permissions for the file, file size, file type, and pointers to the highest level of indirect blocks for the file. Each file has its own inode, which is stored in a corresponding inode file for the volume that contains the file. The inode file itself is also represented as a buffer tree in the storage server.

Figure 3:
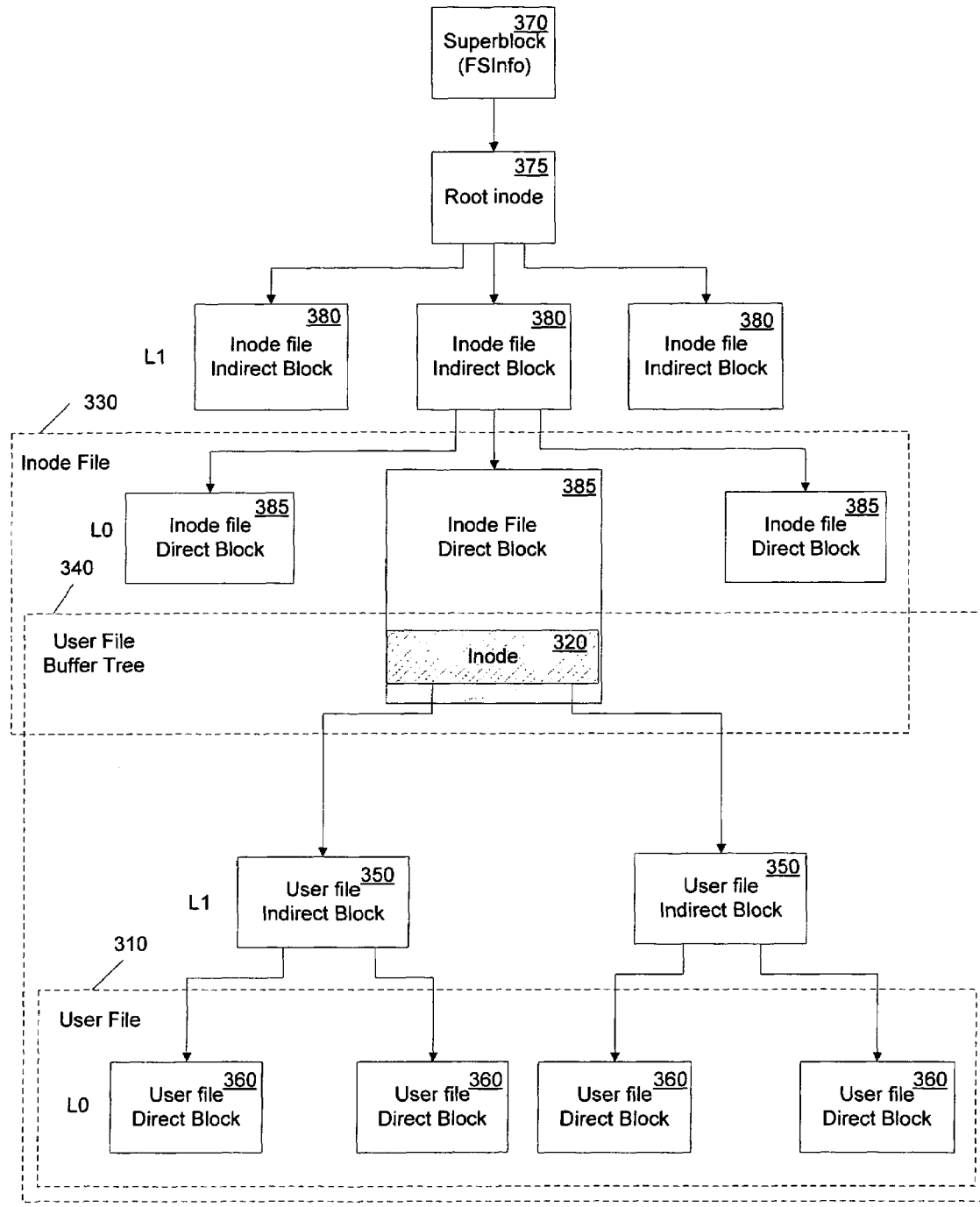
FIG. 3 illustrates an example of a file system maintained by the storage server.

FIG. 3 shows an example of a file system (e.g., a volume) which is represented in the storage server 2 in the form of buffer trees. Each user data file 310 in the volume is assigned an inode 320, which in the illustrated embodiment directly references Level 1 (L1) indirect blocks 350 of the file. To simplify description, FIG. 3 illustrates an embodiment with only two levels of blocks below the inode 320, i.e., one level of indirect (L1) blocks 350 and one level of direct (L0) blocks 360. However, the storage server 2 may allow three or more levels of blocks below the inode 320, i.e., two or more levels of indirect blocks (e.g., L1, L2, etc.) and one level of direct (L0) blocks.

Each user file inode 320 and each user file indirect block 350 includes at least one pointer to a physical block in the aggregate (which may be a direct or indirect block). The inode 320 and indirect blocks 350 in FIG. 3 are shown pointing to only two lower-level blocks each in FIG. 3, to simplify description. However, any inode or indirect block can actually point to more than two other blocks.

For each volume maintained by the storage server 2, the inodes of each file within that volume are stored in a special inode file 330, which is not accessible to users. As with user data files, the inode file 330 is also represented in the storage server 2 in the form of a buffer tree. A separate inode file 330 is maintained for each volume in the storage system. Each inode 320 in an inode file 330 is the root of the buffer tree 340 of a corresponding user data file 310.

The location of the inode file 330 for each volume can be determined by initially referring to a superblock (also called "fsinfo block") 370 associated with that volume. The superblock 370 is a metadata container that contains metadata for the volume as a whole. The superblock 370 points to a root inode 375 for the volume. The root inode 375 is the inode of the inode file 330 of the volume. The root inode 375 may point to one or more indirect blocks 380 of the inode file 330, each of which points to one or more inode file direct blocks 385 of the inode file 330. Each inode file direct block 385 can store a predetermined number N of user file inodes 320.

There are at least three types of situations in which it may be desirable for the storage server 2 to handle data corruption or inconsistency without panicking: 1) problems while mounting a volume, 2) problems while loading a "snapshot", and 3) corruption or inconsistencies in inodes or buffer trees. Examples of the first type of situation include the inability to load the root inode of an inode file or other inconsistencies regarding the contents of an inode file or other metadata container. In one embodiment of the invention, instead of panicking the storage server 2 will handle this situation by simply taking the volume offline and indicating to the user that the attempt to mount the volume was unsuccessful. In addition, storage server 2 will automatically send an appropriate message indicating the problem to a remote customer support network site operated by the manufacturer of the storage server 2 and/or to a remote network site operated by the owner and/or administrator of the storage server 2.

Examples of the second type of situation (problems while mounting a snapshot) include the inability to load the inode of a snapshot or other inconsistencies regarding the contents of metadata associated with a snapshot. The term "snapshot" is used herein, without derogation of any trademark rights of Network Appliance, Inc., to mean a read only, persistent, point-in-time image of a set of data (e.g., a volume) and all of its associated metadata. Snapshots of particular volumes may be generated automatically by the storage server 2 at regular intervals, e.g., according to a user-specified schedule. In one embodiment of the invention, instead of panicking in this type of situation, the storage server 2 will just delete the affected snapshot. In addition, storage server 2 will automatically send an appropriate message indicating the problem to a remote customer support network site operated by the manufacturer of the storage server 2. However, a limit may be imposed on the number of snapshots that can be deleted for a particular volume (i.e., without requiring more drastic action), and if that limit is exceeded, the entire volume may be taken offline.

Examples of the third type of situation (inconsistencies in inodes or buffer trees) include: illegal inode contents (e.g., illegal file size or file type); the inode indicates that it has an access control list (ACL) but the ACL cannot be found; a directory names an inode but cannot load it; a directory is internally inconsistent; or, a block pointer points past the end of a file. Errors in this (the third) type of situation may occur when, for example, the storage server 2 attempts to access data on disk in response to a client read or write request.

For certain types of errors that are determined to be minor, instead of panicking the storage server 2 may attempt to automatically correct the error (if correction is necessary), and if possible, to continue with normal operation. One type of error where this course of action may be desirable is an error in one of various block counters that may be maintained by the file system layer (e.g., a counter indicating the number of blocks in an inode). If the counter value is determined to be incorrect and the correct value is known, the counter value can simply be corrected, instead of panicking or taking more drastic action.

Another example is when attempting to free a block of data that is already free. In this case, for example, the storage server 2 may attempt to mark a block as free in a data structure that identifies all of the free data blocks in a particular volume. The storage server 2 may find that the block being freed is already marked as free. In that case, the storage server 2 can simply ignore the command or message to update the data structure and proceed normally.

Of course, there are other possible situations when it may be possible and desirable to correct the fault and/or to continue with normal operation, instead of panicking.

In any case, the particular course of action taken by the storage server in response to a data fault (e.g., corruption or inconsistency) can depend upon the severity of the fault. In one embodiment of the invention (as described further below), instead of panicking, for at least the first few times a given problem occurs for a given inode, the storage server 2 will respond by returning an error message and denying access to the affected inode (and, therefore, to the buffer tree of which it is the root), and by allowing the protocol layer 23 (see FIG. 2) to take any necessary action. In this type of situation, the specific response of the storage server 2 will depend upon the severity of the problem.

To help determine the severity of on-disk data corruption or inconsistency, the file system manager 21 can track corrupted inodes as well as the inode file direct blocks to which the inodes belong. In general, it is considered desirable to take more drastic action only when corruption is found to have spread across more then just a few inode file direct blocks. In certain embodiments, a volume will be taken offline if at least some predetermined number, M, of its inode file direct blocks show corruption or inconsistency. To track this, the file system manager 21 can maintain an in-memory data structure for each volume; this data structure is called Inc_blocks herein. The Inc_blocks data structure keeps track of inconsistent inode file direct blocks and can be sized according to a value that is user-configurable (i.e., can be set or modified by a network administrator).

In an embodiment of the invention, the Inc_blocks data structure for each volume includes buckets for a specified number M of inode file direct blocks and, within each such bucket, includes N inode bins (where N is the maximum number of inodes that an inode file direct block can store). Further in such embodiment of the invention, a volume will only be taken completely off-line if all of the buckets in its Inc_blocks data structure contain at least one inconsistent inode entry. Otherwise, only the inode(s) that represent(s) the bad block(s) will be made inaccessible (this will make inaccessible the user data file of which the inode is the root, but not the entire volume). Thus, increasing the size (i.e., the number of buckets, M) of the Inc_blocks data structure will make the storage server 2 resilient to a greater number of inconsistencies, and decreasing its size will make the storage server 2 less tolerant of inconsistencies. Note that in addition to the size of Inc_blocks being user-configurable, the above-mentioned criterion for whether to take the entire volume offline can also be user-configurable.

Figure 4:
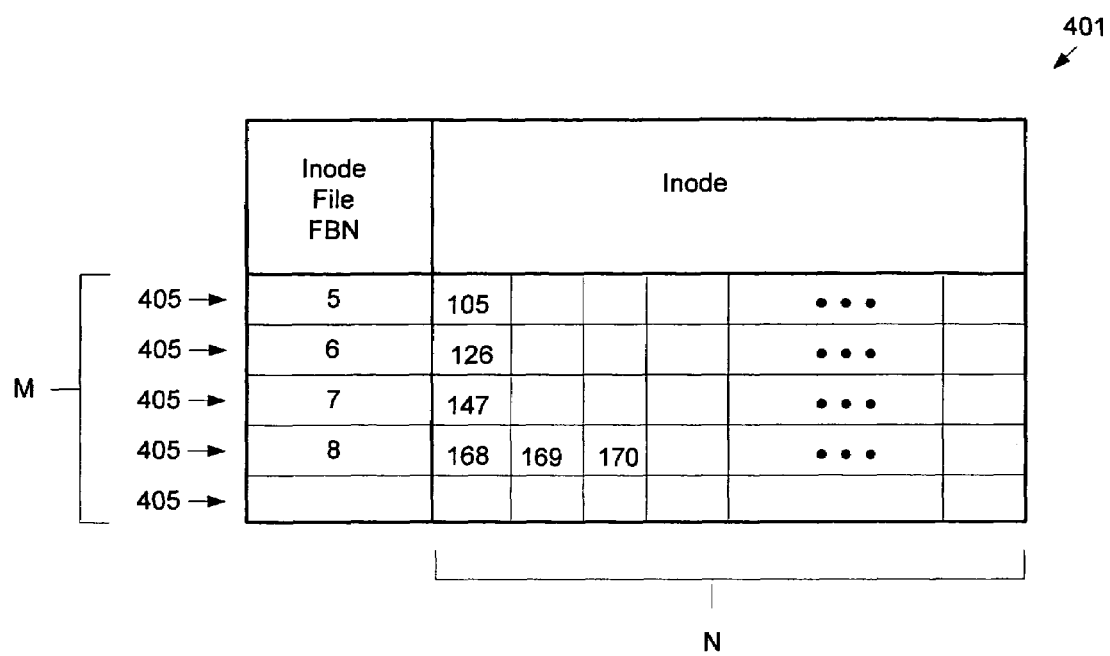
FIG. 4 shows an example of an Inc_blocks data structure.

FIG. 4 shows an example of the Inc_blocks data structure for volume. In the illustrated example the Inc_blocks data structure 401 has a size of five inode file direct blocks (M=5). That is, the data structure 401 is a matrix of five rows (buckets) 405, each row corresponding to one inconsistent inode file direct block. Every block stored by the storage server 2, including inode file direct blocks, is identified by a file block number (FBN), which identifies the offset of the block within the file that contains it. Hence, the data structure 401 includes five buckets 405 for five inode file direct block FBNs. Each row 405 in the data structure 401 has N columns to store a maximum of N inode numbers, where N is the maximum number of inodes that an inode file direct block can store.

The example of FIG. 4 shows that inconsistencies were detected in the inode file direct blocks identified as FBN 5, FBN 6, FBN 7 and FBN 8. In inode file block FBN 5, inode 105 was found to be inconsistent; in inode file block FBN 6, inode 126 was found to be inconsistent; in inode file block FBN 7, inode 147 was found to be inconsistent; and in inode file FBN 8, inodes 168, 169 and 170 were found to be inconsistent. In the example of FIG. 4, since not every bucket (row) 405 in the data structure 401 includes an inode entry, the storage server 2 will not panic. However, if an inconsistency is now found in a fifth inode file direct block, the storage server 2 may be allowed (e.g., by programming) to take the entire volume off-line or take other, more serious action, such as to panic.

As an alternative to (or in addition to) using an Inc_blocks data structure such as described above, the file system manager 21 can maintain any of various other types of data structures to track the severity of on-disk data corruption or inconsistency. One example of an alternative data structure is a table that lists all of the possible types of data corruption or inconsistency that can be anticipated and, for each of them, the appropriate action to take if any. In some instances, the appropriate action may be to update an Inc_blocks data structure such as described above.

Figure 5:
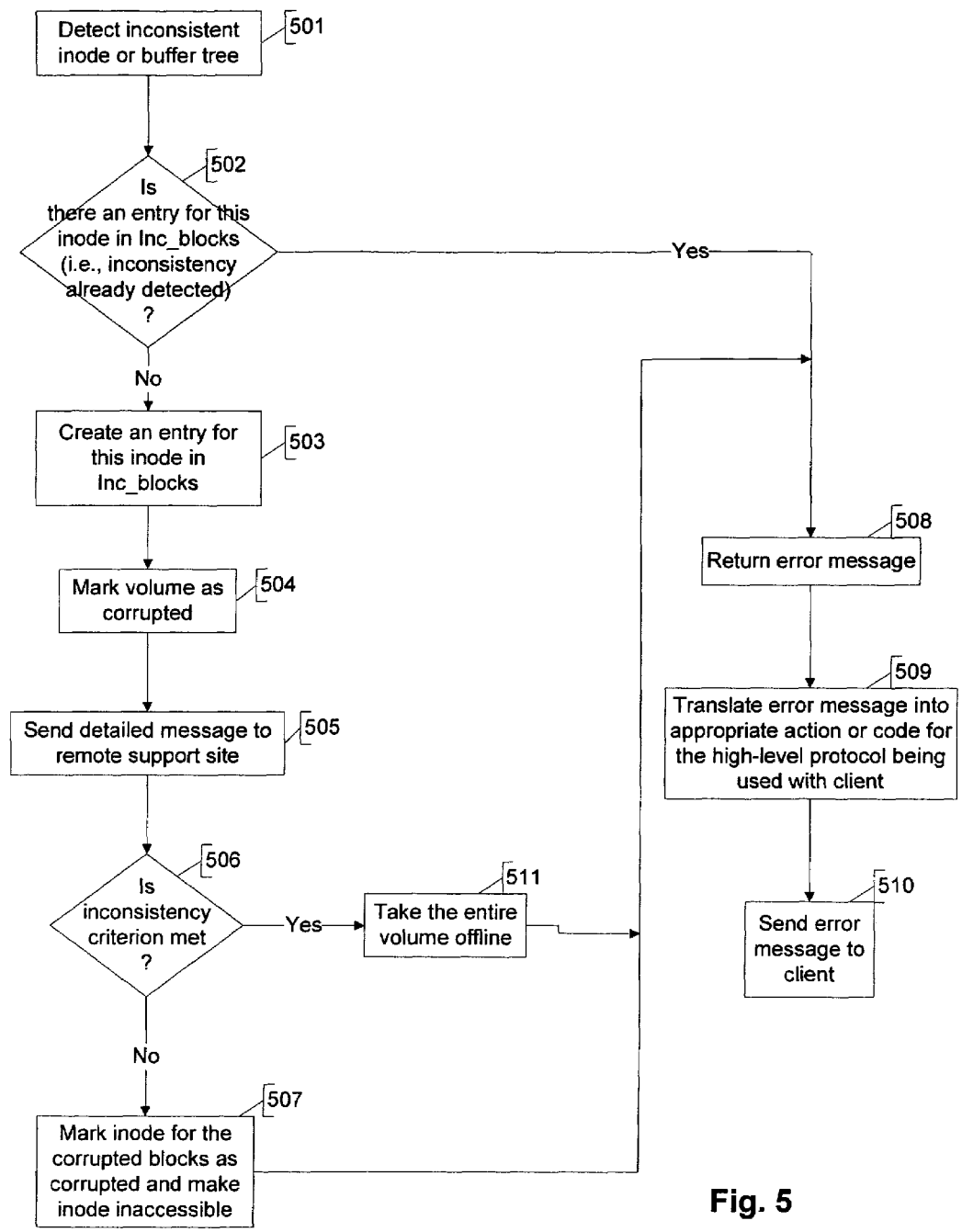
FIG. 5 shows an example of a process executed by the storage server to handle data corruption or inconsistency.

FIG. 5 shows an example of a process for handling data corruption or inconsistency in an inode or buffer tree, according to embodiment of the invention. Initially, at 501 the file system manager 21 detects an inconsistent inode or buffer tree. The technique used to detect this problem is not germane to the present invention, as noted above. The file system manager 21 then determines at 502 whether there is already an entry for this inode in the Inc_blocks data structure for this volume. If such an entry exists, this means that an inconsistency has already been detected in this inode or in the user file buffer tree of which the inode is the root. In that case, the process proceeds to 508, which is described below.

If there is no entry for this inode in the Inc_blocks data structure, then the process continues to 503, where the file system manager 21 creates an entry for this inode in the Inc_blocks data structure. The volume to which this inode belongs is then marked as corrupted at 504. For example, an appropriate flag may be set in the root inode or superblock of the volume.

Next, at 505 a detailed message describing the nature of the problem is sent by the storage server 2 to a remote support site operated by the manufacturer of the storage server 2 and/or to a system administrator. The message may be sent as an e-mail, for example.

Next, a determination is made at 506 of whether a predetermined inconsistency criterion for this volume is satisfied. If the predetermined inconsistency criterion for this volume is satisfied, then the entire volume is taken offline at 511. The inconsistency criterion may be, for example, that the entire volume is taken offline only if all of the buckets in the Inc_blocks data structure for this volume contain at least one inconsistent inode entry. Alternatively, even more drastic action could be taken in this situation, such as allowing the storage server 2 to panic. As noted above, the inconsistency criterion can be user-configurable.

If, on the other hand, the inconsistency criterion is determined not to be satisfied at 506, then the process proceeds to

507. In 507, the specific inode which is corrupted or which points to the corrupted blocks (indirectly or directly) is marked as corrupted and is made inaccessible (although a user can still inquire about the inode's existence and obtain status information about the inode). This action will also make inaccessible the affected user data file, but not the entire volume.

In either case (507 or 511), an appropriate error message 508 is returned to the calling process in the file system manager 21 (FIG. 2). This error message is then passed to the protocol layer 23 of the operating system 20. At 509, within the protocol layer 23 the protocol module for the protocol currently being used with the client (e.g., NFS, CIFS, etc.) then translates the message into an appropriate action or code specific to that protocol. At 510 an appropriate message is then sent to the client that caused the corrupted or inconsistent data to be accessed. For example, for a client using NFS, the message sent to the client may be an "ESTALE" message.

Figure 6:
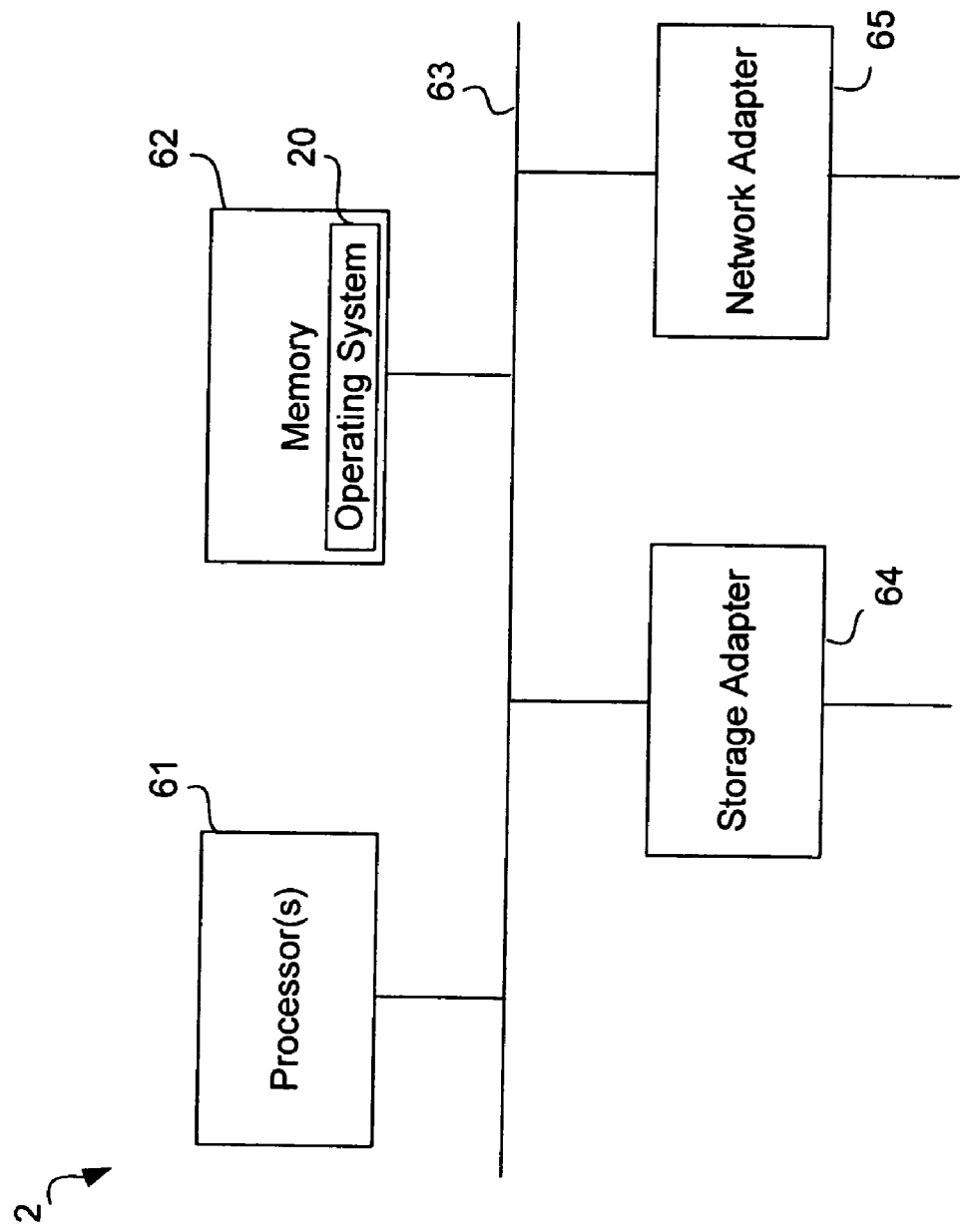
FIG. 6 shows an example of the hardware architecture of the storage server.

FIG. 6 is a block diagram showing an example of the architecture of the storage server 2 at a high level. Certain standard and well-known components which are not germane to the present invention are not shown. The storage server 2 includes one or more processors 61 and memory 62, each coupled to an interconnect 63. The interconnect 63 shown in FIG. 6 is an abstraction that represents any one or more buses, point-to-point connections, and/or other types of connections, which may include one or more appropriate bridges, adapters and/or controllers. The interconnect 63, therefore, may include, for example, a system bus connecting the processors 61 to main memory, a form of peripheral component interconnect (PCI) bus, HyperTransport or industry standard architecture (ISA) bus, small computer system interface (SCSI) bus, universal serial bus (USB), Inter-IC (I2C) bus, or Firewire (IEEE standard 1394) connection.

The processors 61 are the central processing units (CPUs) of the file server 2 and, thus, control its overall operation. In certain embodiments, the processors 61 accomplish this by executing software stored in memory 62. Such processor 61 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 62 includes the main memory of the file server 2. Memory 62 represents any form of random access memory (RAM), read-only memory (ROM), flash memory, or the like, or a combination of such devices. Memory 62 stores (among other things) the storage server's operating system 20, which can implement the technique introduced herein.

Also connected to the processors 61 through the interconnect 63 are a storage adapter 64 and a network adapter 65. The storage adapter 64 allows the file server 2 to access the storage subsystem 4 and may be, for example, a Fibre Channel adapter or a SCSI adapter. The network adapter 65 provides the file server 2 with the ability to communicate with remote devices, such as the clients 1, over a network and may be, for example, an Ethernet adapter, a Fibre Channel adapter, or the like.

Thus, a method and apparatus for handling data corruption or inconsistency in a network storage system have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
  maintaining data in a mass storage subsystem;
  providing access to the data on behalf of a client;
  detecting a fault in a set of data stored in the mass storage subsystem;
  determining a severity of the fault; and
  selecting a course of action from a plurality of courses of action in response to the fault, based on the severity of the fault, wherein each of the plurality of courses of action handles a fault.

2. A method as recited in claim 1, further comprising:
  determining an error type of the fault, wherein the error type is one of a plurality of error types; and
  denying client access to only a portion of the set of data which contains the fault while continuing to allow client access to the remainder of the set of data based on the whether the severity of the fault exceeds a predetermined severity that is determined according to the error type.

3. A method as recited in claim 2, wherein the set of data includes a plurality of blocks, and wherein said denying client access to only a portion of the set of data which contains the fault while continuing to allow client access to the remainder of the volume comprises:
  denying client access to only blocks in the set of data which contain the fault while continuing to allow client access to other blocks in the set of data.

4. A method as recited in claim 1, wherein the selected course of action comprises:
  if the severity of the fault exceeds a predetermined severity, then offlining the set of data.

5. A method as recited in claim 1, wherein the selected course of action comprises:
  if the fault is of a predetermined type, then automatically attempting to correct the fault.

6. A method as recited in claim 1, wherein detecting a fault in the set of data comprises:
  detecting a data corruption or inconsistency on the set of data.

7. A method as recited in claim 1, wherein the predetermined severity is user-configurable.

8. A method as recited in claim 1, further comprising:
  storing a record of the fault while continuing to provide access to the data on behalf of the client.

9. A method as recited in claim 5, further comprising:
  detecting a subsequent fault in the set of data; and
  in response to the subsequent fault, offlining the set of data.

10. A method as recited in claim 1, further comprising:
  sending a first error message to a user, sending a second error message to a remote support site, and marking the set of data as corrupt.

11. A method as recited in claim 1, wherein the set of data includes a plurality of blocks, and wherein determining a severity of the fault comprises determining a number of blocks in the set of data which contain corrupt or inconsistent data.

12. A method of handling a fault in a storage system which includes a storage server, the method comprising:

operating the storage server to maintain a volume of data in a mass storage subsystem, the volume including a plurality of blocks;

operating the storage server to provide access to the volume to a client;

operating the storage server to detect a data corruption or inconsistency in the volume;

determining, in the storage server, an error type of the data corruption or inconsistency, wherein the error type is one of a plurality of error types;

determining a severity of the data corruption or inconsistency;

if the severity of the data corruption or inconsistency does not exceed a predetermined severity that is determined according to the error type of the data corruption or inconsistency, then operating the storage server to deny client access to a portion of the volume affected by the data corruption or inconsistency while continuing to allow client access to another portion of the volume; and if the severity of the data corruption or inconsistency exceeds a predetermined severity, then operating the storage server to take the volume offline.

13. A method as recited in claim 12, further comprising:

sending a first error message to a user, sending a second error message to a remote support site, and marking the volume as corrupt.

14. A method as recited in claim 12, wherein the predetermined severity is user-configurable.

15. A storage server comprising:

a network interface through which to communicate with a client via a network;

a storage interface through which to access data stored in a mass storage subsystem which includes a plurality of mass storage devices, in response to a request received from the client; and a file system manager to store and organize data in the mass storage subsystem as a plurality of volumes, the file system manager including logic to detect a fault in a volume stored in the mass storage subsystem;

logic to determine an error type of the fault, wherein the error type is one of a plurality of error types;

logic to determine a severity of the fault; and logic to deny access to only a portion of the volume which contains the fault while continuing to allow access to the remainder of the volume, if the severity of the fault does not exceed a predetermined severity that is determined according to the error type of the fault.

16. A storage server as recited in claim 15, wherein the file system manager further includes logic to take the volume offline if the severity of the fault exceeds a predetermined severity.

17. A storage server as recited in claim 15, wherein the fault in the volume comprises a data corruption or inconsistency in the volume.

18. A storage server as recited in claim 15, wherein the predetermined severity is user-configurable.

19. A storage server as recited in claim 15, wherein the file system manager further includes logic to store a record of the fault while continuing to provide access to the data on behalf of the client.

20. A storage server as recited in claim 19, wherein the file system manager further includes:

logic to detect a subsequent fault in the volume; and logic to take the volume offline in response to the subsequent fault.

21. A storage server as recited in claim 15, wherein the file system manager further includes:

logic to send a first error message to a user, logic to send a second error message to a remote support site, and logic to mark the volume as corrupt.

22. A storage server as recited in claim 15, wherein the volume includes a plurality of blocks, and wherein the logic to determine the severity of the fault includes logic to determine the severity of the fault by determining a number of blocks in the volume which contain corrupt or inconsistent data.

23. A storage server as recited in claim 15, wherein the volume includes a plurality of blocks, and wherein the logic to deny access to only a portion of the volume includes logic to deny client access to only blocks in the volume which contain the fault while continuing to allow client access to other blocks in the volume.

24. A storage server as recited in claim 15, wherein the network interface comprises a plurality of protocol modules, each protocol module including logic to implement a different protocol by which a client can communicate with the storage server;

and wherein in response to detecting the fault, the file system manager generates an error code, and one of the protocol modules translates the error code to a corresponding message in a protocol which said one of the protocol modules implements, to communicate the fault to the client.

* * * * *